US012638392B2

(12) United States Patent
Smith et al.

(10) Patent No.: US 12,638,392 B2
(45) Date of Patent: May 26, 2026

(54) RELATING TO A DEVICE FOR IMAGING

(71) Applicant: Panacea Diagnostics Ltd, London (GB)

(72) Inventors: Callum Robertson Smith, Kongens Lyngby (DK); David R. Klug, London (GB); Stefan Leo Van Workum, London (GB)

(73) Assignee: Panacea Diagnostics Ltd, London (GB)

( * ) Notice: Subject to any disclaimer, the term of this patent is extended or adjusted under 35 U.S.C. 154(b) by 153 days.

(21) Appl. No.: 18/720,374

(22) PCT Filed: Dec. 16, 2022

(86) PCT No.: PCT/GB2022/053264
§ 371 (c)(1),
(2) Date: Jun. 14, 2024

(87) PCT Pub. No.: WO2023/111586
PCT Pub. Date: Jun. 22, 2023

(65) Prior Publication Data
US 2025/0085221 A1      Mar. 13, 2025

(30) Foreign Application Priority Data

Dec. 17, 2021    (GB) ..................................... 2118374

(51) Int. Cl.
*G01N 21/552* (2014.01)
*G02B 17/00* (2006.01)
(Continued)

(52) U.S. Cl.
CPC ......... *G01N 21/552* (2013.01); *G02B 17/006* (2013.01); *G02B 21/361* (2013.01); *G01N 2021/473* (2013.01)

(58) Field of Classification Search
CPC ........... G01N 21/552; G01N 2021/473; G01N 21/648; G01N 21/53; G01N 2201/064; (Continued)

(56) References Cited

U.S. PATENT DOCUMENTS 6,511,854 B1 * 1/2003 Asanov ............ G01N 33/54393
436/805
9,841,421 B2 * 12/2017 Dittmer .................. G01N 27/72
(Continued)

FOREIGN PATENT DOCUMENTS

WO        2008155716 A1    12/2008
WO        2010060998 A      6/2010
WO        WO-2020178564 A1 *  9/2020   ........... G01N 21/648

OTHER PUBLICATIONS

UKIPO Search Report for Application No. GB2118374.4 mail date May 9, 2022, 2 pages.
(Continued)

*Primary Examiner* — Isiaka O Akanbi
(74) *Attorney, Agent, or Firm* — Maine Cernota & Curran

(57) ABSTRACT

A substrate for facilitating the measurement, using Total Internal Reflection microscopy, of the status of an assay; a first surface including a test site at which one or more reagents for the assay are immobilised; a second surface substantially parallel to the first surface; a third surface joining the first and second surfaces; a fourth surface joining the first and second surfaces; wherein three characteristics of the surfaces are manipulated to ensure that light launched through the third surface impinges on the centre of the first surface solely at the test site and then undergoes Total Internal Reflection; wherein the three characteristics are: the length of the first and second surfaces between the third and fourth surfaces; the length of the third and fourth surfaces; the angle subtended between the first and third surfaces.

10 Claims, 3 Drawing Sheets

(51) Int. Cl.
  G02B 21/36      (2006.01)
  G01N 21/47      (2006.01)

(58) Field of Classification Search
  CPC ... G02B 17/006; G02B 21/361; G02B 21/082
  USPC ....... 356/445, 446, 342, 128, 137, 138, 301,
                                        356/435, 436, 317
  See application file for complete search history.

(56)              References Cited

U.S. PATENT DOCUMENTS

| | | | | |
|---|---|---|---|---|
| 9,983,128 | B2 * | 5/2018 | Neijzen | ............. B01L 3/502715 |
| 2004/0130723 | A1 * | 7/2004 | Yager | ................... G01N 21/553 |
| | | | | 356/445 |
| 2009/0028492 | A1 | 1/2009 | Wu | |
| 2009/0086212 | A1 | 4/2009 | Kitamura | |
| 2010/0197038 | A1 * | 8/2010 | Verschuren | .......... G01N 21/552 |
| | | | | 436/164 |
| 2010/0252751 | A1 * | 10/2010 | Klunder | ............... G01N 21/648 |
| | | | | 250/459.1 |
| 2014/0118745 | A1 * | 5/2014 | Neijzen | ................... G01N 21/31 |
| | | | | 356/432 |
| 2015/0293274 | A1 * | 10/2015 | Cagran | .................... G02B 1/02 |
| | | | | 359/833 |
| 2017/0146455 | A1 * | 5/2017 | Mäntele | ............... A61B 5/1455 |
| 2018/0003619 | A1 * | 1/2018 | Sieben | ............... G01N 33/2835 |
| 2022/0146425 | A1 * | 5/2022 | Van Workum | ....... G01N 21/648 |
| 2023/0280338 | A1 * | 9/2023 | Dorrestijn | ........ G01N 33/54373 |
| | | | | 435/288.7 |
| 2023/0321648 | A1 * | 10/2023 | Dorrestijn | ............. B01L 3/5023 |
| | | | | 422/421 |

OTHER PUBLICATIONS

International Search Report and Written Opinion for International
Application No. PCT/GB2022/053264 mail date Mar. 14, 2023, 8
pages.

* cited by examiner

RELATING TO A DEVICE FOR IMAGING

RELATED APPLICATIONS

This application is a national phase application filed under 35 USC § 371 of PCT Application No. PCT/GB2022/053264 with an International filing date of Dec. 16, 2022, which claims priority of GB Patent Application 2118374.4 filed Dec. 17, 2021. Each of these applications is herein incorporated by reference in its entirety for all purposes.

FIELD OF THE INVENTION

The present invention relates to a substrate for facilitating the measurement of the status of an assay, and in particular to a substrate for use in a Total Internal Reflection (TIR) imaging system.

BACKGROUND TO THE INVENTION

Total internal reflection (TIR) occurs at the interface between a higher refractive index medium and a lower refractive index medium. Above the critical angle, defined by the refractive indices of the two media, light travelling in a higher refractive-index medium incident on a lower refractive-index medium is totally internally reflected. This total internal reflection generates an exponentially decaying light field, known as an evanescent field. The evanescent field can be used to excite luminescent molecules or scattering particles in very close proximity to the boundary between the two media. These luminescent molecules will consequently emit light at a certain wavelength or range of wavelengths, which can be selectively detected to provide information on the boundary region. The luminescence may arise from fluorescence or phosphorescence.

Owing to its high sensitivity and surface-proximate selectivity, TIR can be used to detect signals from small quantities of sample in assay devices. The sample, typically a saliva sample, is located at a test site on an optical element which is illuminated with a main illumination beam. This beam refracts on transmission through the input surface of the optical element, undergoes total internal reflection at the test site, and refracts on transmission through the output surface of the optical element. These refractive steps include cases where the incident light is normal to the refracting surface. The signal produced by relevant species excited by the evanescent field at the test site is imaged by a lens onto an image sensor.

The beam refracting at the input and output surfaces of the optical element can be a major source of background noise in a TIR imaging system. Fresnel reflections occur at the interface between two materials with different refractive indices. Reflections within the optical substrate can interact with features within the system and cause unwanted scattering of light which can be directly or indirectly collected by the imaging lens and directed onto the image sensor. This increases the background level of the image, with the exact background distribution dependent on the specific nature of the deleterious scattering sites. This subsequently reduces the signal-to-background ratio and signal-to-noise ratio of images obtained using a TIR-based optical imaging system setup. This is particularly important when the signal being detected is itself based on scattering of the input light. In this case filters cannot be used to mitigate the interference of unwanted scattering by filtering it from the desired scattering signal. In the case of luminescence detection, scattered light can still cause interference through the creation of secondary luminescence.

In order to reduce the amount of unwanted light scattered within the substrate, it is possible to coat the optical substrates with an anti-reflective coating. However, when considering disposable or single-use optical substrates for use in high-throughput assaying devices, coating substrates may be impractical, and may cause challenges with cost effectiveness and reproducibility when considering scaled-up manufacturing.

There is therefore a requirement for a device which can minimise the amount of unwanted light scattering when measuring a sample within a Total Internal Reflection optical imaging system. The device must be compatible with the scaled-up manufacturing of optical substrates for use in high-throughput assaying devices and lab-on-a-chip systems, and must therefore be cost effective and simple such that it can be reliably reproduced.

It is against this background that the present invention has arisen.

SUMMARY OF THE INVENTION

According to the present invention, there is provided a substrate for facilitating the measurement, using a Total Internal Reflection based optical imaging system, of the status of an assay; the substrate comprising: a first surface including a test site at which one or more reagents for the assay are immobilised; a second surface substantially parallel to the first surface; a third surface joining the first and second surfaces; a fourth surface joining the first and second surfaces; wherein three characteristics of the surfaces are manipulated to ensure that light launched through the third surface impinges on the first surface solely in the vicinity of the test site and then undergoes Total Internal Reflection; wherein the three characteristics are: the length of the first and second surfaces between the third and fourth surfaces; the length of the third and fourth surfaces; the angle subtended between the first and third surfaces.

The substrate of the present invention may facilitate measurements of a sample, typically a saliva sample, at the test site, using a TIR based optical imaging system. One major source of interference in TIR based optical imaging systems is Fresnel reflections within an optical substrate, which can lead to stray beams that initiate deleterious scattering. Unwanted scattered light can increase the background noise when obtaining sample measurements, and reduce the quality of images and/or measurements obtained. The substrate of the present invention minimises unwanted scattered light within the substrate, by ensuring that the light launched through the third surface of the substrate impinges on the centre of the first surface and therefore solely at the test site. The substrate of the present invention ensures that the light does not impinge on other features of the substrate, such as the corners, which could cause unwanted scattering.

Within the context of the present invention, the term "solely in the vicinity of the test site" should be understood to mean that the light impinges substantially solely at the test site, in other words, it does not impinge at other points on the first surface other than the test site. Ideally, the light launched through the third surface is collimated and therefore the light has a minimal divergence from the main beam path. Ideally, substantially all of the light impinges on the test site at an angle above the critical angle required for Total Internal Reflection. However, it should be understood that there may be a portion of the light which strays from the main beam path, owing to the beam having some non-ideal properties, and therefore there may be a portion of the beam which impinges merely near the test site on the first surface.

By manipulating the length of the surfaces and the angle subtended between the first and third surfaces, the substrate of the present invention can be used as a cost-effective solution to minimising unwanted scattering when taking TIR measurements. The solution is also well-suited to scaled-up manufacturing because there is no requirement for additional parts, and the length and the angles of the substrate can be manipulated reliably and with good reproducibility. Therefore the substrate of the present invention is compatible with commercial assay devices to be produced at high-volumes.

Within the context of this invention, the centre of the first surface is defined to be that part which accommodates to the test site. This part of the first surface is aligned with the microfluidic channel through which the sample flows, in use. The centre of the first surface is not adjacent to the walls of the microfluidic channels as the refractive index of the material from which the microfluidic channel is formed may be different from the refractive index of the sample and therefore the light may not be totally internally refracted as a result of impinging at the substrate-channel wall boundary. This can result in unwanted scattering. It should be noted that the test site may not be equidistant between the third and fourth surfaces of the substrate, but the "centre" of the first surface is still deemed to be the part of the surface adjacent the test site.

Furthermore, according to the present invention there is provided a substrate for facilitating the measurement, using a Total Internal Reflection based optical imaging system, of the status of an assay; a first surface including a test site at which one or more reagents for the assay are immobilised; a second surface substantially parallel to the first surface; a third surface joining the first and second surfaces; a fourth surface joining the first and second surfaces; wherein three characteristics of the surfaces are manipulated to ensure that light launched through the third surface impinges on the first surface substantially at the test site and then undergoes Total Internal Reflection; impinges on the fourth surface and is partially reflected to impinge on the second surface; wherein the reflected light forms a closed loop reflection pattern; wherein the three characteristics are: the length of the first and second surfaces between the third and fourth surfaces; the length of the third and fourth surfaces; and the angle subtended between the first and third surfaces.

In some embodiments, after undergoing Total Internal Reflection at the first surface, at least a portion of the light may be transmitted through the fourth surface. In some embodiments, after undergoing Total Internal Reflection at the first surface, the majority of the light beam is output from the substrate at the fourth surface. Typically, the reflected light is around 4% of the light and the remaining 96% of the light is transmitted.

In some embodiments, as the light impinges on the interface between the fourth surface of the substrate and the air outside the substrate, Fresnel reflections may occur as the two materials have different refractive indices. The magnitude of light reflected and transmitted at the interface is dictated by the refractive indices of the two materials, the angle of light incident on the interface, and the polarisation properties of the incident light. For unpolarised visible light normally incident on a glass-air interface, approximately 4% of the light is reflected and approximately 96% is transmitted.

In some embodiments, the angle subtended between the first and third surfaces is between 70° and 95°, for example 72° to 74°. In some embodiments, the angle subtended between first and third surfaces is 90°. In some embodiments, the third and fourth surfaces of the substrate may be substantially parallel to each other and perpendicular to the first and second surfaces. In some embodiments, a substrate with substantially orthogonal surfaces is more cost-effective and efficient to manufacture compared to a substrate with angled surfaces such as a prism shaped substrate, for example. Therefore, in some embodiments, a substrate with third and fourth surfaces substantially perpendicular to the first and second surfaces may be better suited for use in a high-throughput assaying device.

In some embodiments, after undergoing Total Internal reflection at the second surface, the reflected light may impinge on the third surface of the substrate. In some embodiments, the reflected light may spatially overlap with the light launched through the third surface. In some embodiments, as the reflected light impinges on the third surface at the substrate-air interface, a portion of the reflected light is reflected back towards the centre of the substrate. In some embodiments, in which the beam is non-diverging and the angle subtended between the first and third surfaces is substantially 90°, the reflection of the reflected light at the third surface may close a diamond-shaped reflection loop. In some embodiments, the reflected light continues to travel along the diamond-shaped loop indefinitely, growing weaker on each reflection until the number of photons in the beam is reduced to a point where no further reflection occurs. This is an ideal scenario, since light from Fresnel reflections interacts with the centre of each optical surface, away from corners and features of the microfluidic channel incorporated on the substrate.

In some embodiments, the formation of a diamond-shaped reflection loop ensures the internal reflections within the substrate are not incident on regions that would result in unwanted scattering, such as the corners of the substrate.

In some embodiments, the substrate may be glass. In some embodiments, the substrate is preferably a glass substrate. In some embodiments, the substrate may be, but is not limited to, float glass, borosilicate glass or, fused quartz. In some embodiments, a glass substrate may be well-suited for use in interrogating assays in a Total Internal Reflection based optical imaging system because it produces a lower level of unwanted light scattering compared to other substrate materials such as plastic for example. In some embodiments, a glass substrate is preferable because it is a more cost effective substrate compared to other substrate materials such as sapphire for example.

In some embodiments, at least one of the surfaces of the substrate may be polished. In some embodiments, the third and fourth surfaces of the substrate may be polished. In some embodiments, it may be important for at least one surface of the substrate to be polished such that it has a high optical quality in order to reduce the scattering of light as the light is transmitted through the surface.

In some embodiments, the length of the first and second surfaces between the third and fourth surfaces, sometimes referred to as the width of the substrate, may be 5 to 130 mm, more particularly 20 to 40 mm. In some embodiments, the length of the third and fourth surfaces, sometimes referred to as the thickness of the substrate is between 0.5 and 10 mm, in particular 1 to 5 mm.

In some embodiments, the length of the surfaces may be manipulated such that the light launched through the third surface impinges solely in the centre of the first substrate, which coincides with the location of the test site. In some embodiments, the length of the surfaces may be manipulated such that the light reflected onto the first and/or second substrates from the fourth and/or third substrates reflects at a suitable angle to avoid features which may lead to unwanted scattering of light such as the corners of the substrate. The corners of the substrate may typically have a lower optical quality owing to bevels, chipping and/or cracking for example.

In some embodiments, the first surface of the substrate may form part of a microfluidic channel. In some embodiments, the substrate, including the test site, may form part of a microfluidic channel. In some embodiments, the substrate may be used to carry out assay measurements on a liquid sample within the microfluidic channel. In some embodiments, forming a closed reflection loop may avoid features of the microfluidic channel in addition to the substrate, such that that there is substantially no interaction between the reflected beam and the features of the microfluidic channel.

Furthermore, according to the present invention there is provided a substrate for facilitating the measurement, using a Total Internal Reflection based optical imaging system, of the status of an assay; the substrate comprising: a first surface including a test site at which one or more reagents for the assay are immobilised; a second surface substantially parallel to the first surface; a third surface joining the first and second surfaces; a fourth surface joining the first and second surfaces; wherein three characteristics of the surfaces are manipulated to ensure that light launched through the third surface impinges on the first surface substantially at the test site and then undergoes Total Internal Reflection; impinges on the fourth surface and is substantially reflected back to the first surface; such that the reflected light forms a closed loop refection pattern; wherein the three characteristics are: the length of the first and second surfaces between the third and fourth surfaces; the length of the third and fourth surfaces; the angle subtended between the first and third surfaces.

In some embodiments, the substrate may be a dove-prism or a rectangular block. Other prismatic geometries can also be used. In some embodiments, when the light impinges on the interface between the fourth surface of the substrate and the air outside the substrate, at least a portion of the light may be reflected back to the first surface, where it may impinge at the test site. After impinging at the test site, the light may impinge on the third surface and a closed reflection loop may be formed, in which the portion of reflected light, is reflected back and forth along the same path between the third and fourth surfaces of the substrate.

In some embodiments, there may be provided a system for reducing unwanted light scattering in a substrate used for imaging a test site in a Total Internal Reflection (TIR) microscope, the system comprising: a substrate according to any of the embodiments described herein; an incident beam which illuminates the test site at such an angle to facilitate TIR; wherein a portion of the incident beam is reflected at the third and fourth surfaces of the substrate; a closed reflection loop formed by the reflected portion of the incident beam, which at least partly follows the same path within the substrate as the incident beam; and wherein by at least partly following the same path as the incident beam, the closed reflection loop reduces unwanted light scattering by avoiding interaction with features of the substrate which could cause the beam to scatter.

In some embodiments, the substrate of the present invention may form part of a system used to interrogate a test site within a total internal reflection based optical imaging system. In some, embodiments, the system may be used to interrogate and image the test site with a reduced unwanted scattering of light which can be a major source of background signal in TIR systems. A TIR system, comprising a closed reflection loop in which at least part of the closed reflection loop follows the same path as the incident beam, prevents the reflected portion of the beam from scattering on features other than optical surfaces of the substrate.

In some embodiments, the system may further comprise a light source. In some embodiments, the light source may be a laser beam. Alternatively, the light source may be an LED or a Super Luminescent Diode (SLD). The illuminating light may be spatially and temporally coherent by using a laser beam as a light source. In some embodiments, the laser beam can be a collimated beam because of its high coherence and low divergence. A collimated beam of light is a beam which has a low beam divergence. In some embodiments, a low beam divergence and a right-angled substrate may ensure the circulating beam in the closed reflection loop does not interact with undesired regions of the system.

The wavelength of the light emitted by the light source is selected to enhance the efficiency of the total internal reflection that occurs at the test site. The critical angle of total internal reflection depends on the ratio of the refractive indices of the substrate and the sample, which is typically saliva.

The incident beam is launched from the light source at such an angle to facilitate TIR at the test site. If the incident beam angle is too steep, the reflected beam within the substrate may interact with the features of the substrate and/or the microfluidic channel which may cause unwanted scattering of the beam.

In some embodiments, the system may further comprise a detector. In some embodiments, the detector may further comprise imaging optics and an imaging sensor. In some embodiments, the signal produced by relevant optical labels at the test site may be imaged by imaging optics onto an imaging sensor. In some embodiments, the system can be used to reduce the amount of unwanted scattering of light being collected by the imaging system and can subsequently increase the signal-to-background ratio and signal-to-noise ratio of an image obtained using the system. Therefore the sensitivity of the system of the present invention may be increased compared to a typical TIR imaging system.

FIGURES

The present invention will now be described, by way of example only, with reference to the accompanying figures in which.

DETAILED DESCRIPTION

Figure 1:
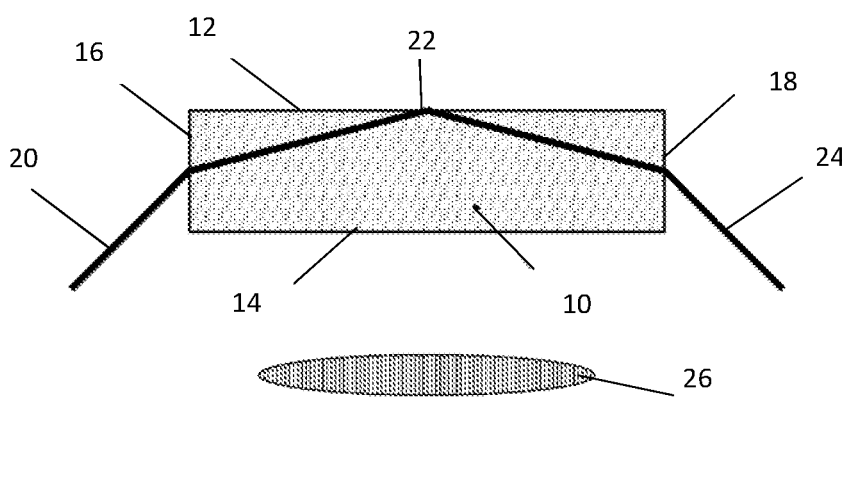
FIG. 1 shows a typical Total Internal Reflection microscope setup.

FIG. 1 shows a Total Internal Reflection based optical imaging system that is a microscopy system and a substrate 10. The substrate comprises a first surface 12 which is the location of the test site 22, a second surface 14, a third surface 16 which is also the input surface for the incident beam 20, and a fourth surface 18 which is also the output surface for the output beam 24. Using the Total Internal Reflection microscopy architecture shown in FIG. 1, a sample located at the test site 22 can be interrogated by the incident beam 20. The incident beam 20 refracts on transmission through the third surface 16 and undergoes Total Internal Reflection at the test site 22. The subsequent optical radiation produced by the sample can be imaged by a lens 26 onto an image sensor 28. After undergoing Total Internal Reflection, the beam refracts again on transmission through the fourth surface 18.

Figure 2:
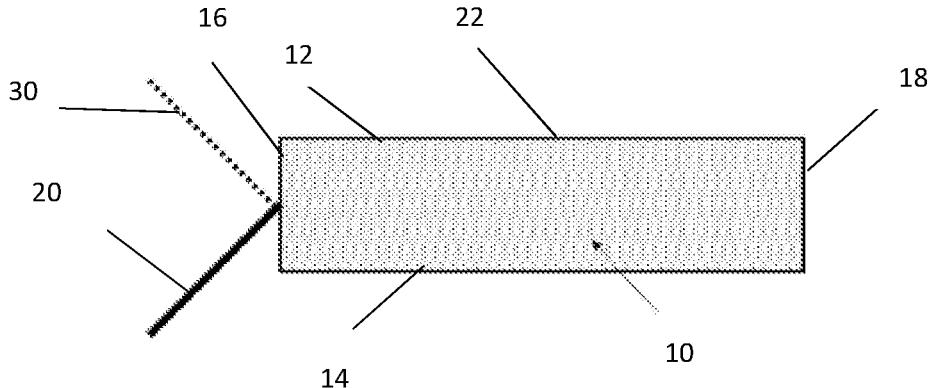
FIG. 2 shows a substrate with an incident beam undergoing a Fresnel reflection at the air-glass interface at the input face of the substrate.
Figure 3:
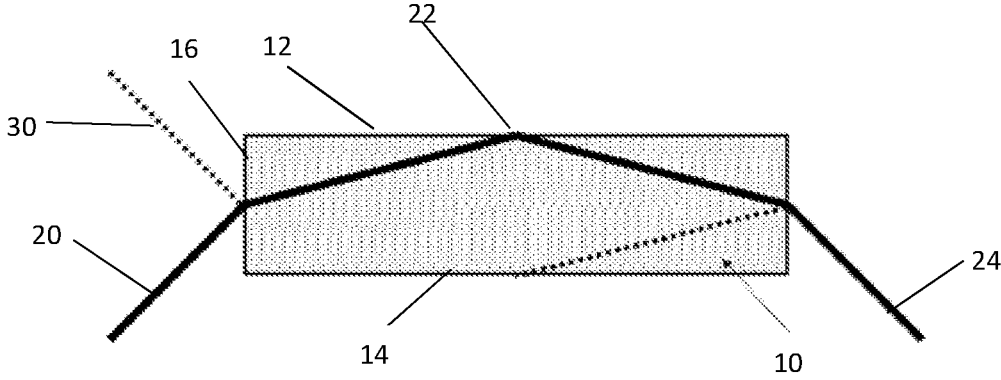
FIG. 3 shows the substrate of FIG. 2, with an additional Fresnel reflection at the air-glass interface at the output face of the substrate.

FIG. 1 considers only the dominant transmitted beams, and does not depict weaker reflected beams. The light refracting at the third surface 16 and the fourth surface 18, can be a major source of background signal in TIR images. Fresnel reflections occur at the interface between two materials with different refractive indices. Referring to FIG. 2, the Fresnel reflection of light 30 as the incident beam 20 impinges on the third surface 16 is shown. Referring to FIG. 3, an additional Fresnel reflection 32 is shown as light impinges at the fourth surface 18 after undergoing Total Internal Reflection at the test site 22.

The scattered light resulting from Fresnel reflections within the substrate 10 can be can be directly or indirectly collected by the imaging lens 26 and directed onto the image sensor 28. This will increase the background level of the images obtained using the system, with the exact background distribution dependent on the specific nature of the deleterious scattering sites. This subsequently reduces the signal-to-background ratio and signal-to-noise ratio of the images and reduces the sensitivity of the TIR system.

According to the present invention, the surfaces of the substrate 10 may be manipulated such that light launched through the third surface 16 impinges at the centre of the first surface 12 solely at the test site 22 and then undergoes Total Internal Reflection, as shown in FIG. 3. The characteristics of the substrate can be manipulated such that the Fresnel reflection 32 reflects from the fourth surface 18 and back towards the centre of the substrate 10. FIG. 3 shows a substrate 10 with an angle subtended between the first surface 12 and third surface 16 of 90. Along with the angle subtended between the surfaces, the length of the surfaces may manipulated such that the reflected beam 32 is incident on the second surface 14 of the substrate 10, as shown in FIG. 3.

Although FIGS. 1 to 3 provide an example system that is based around microscopy, it will be understood that, in some embodiments, the optical imaging system may not magnify the image or, indeed, may de-magnify the image.

Figure 4:
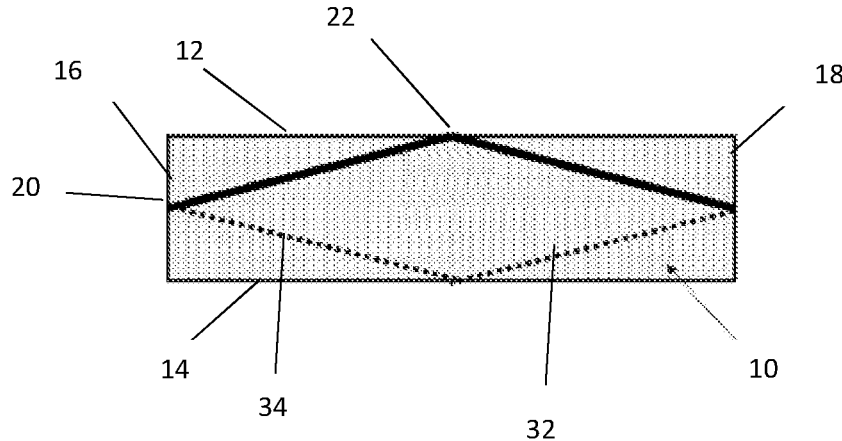
FIG. 4 shows a diamond-shaped light path within the substrate.

Referring to FIG. 4, according to the present invention, the characteristics of the substrate 10 may be manipulated such that the reflected beam 32 is incident on the second surface 14 of the substrate 10 at the same angle as the incident beam 20 is incident on the first surface 12, and therefore also undergoes Total Internal Reflection. As shown in FIG. 4, the light path within the substrate may form a diamond-shaped loop. The Fresnel reflected beam 34 spatially overlaps with the incident beam 20 at the third surface 16 and a portion of the Fresnel reflected beam is reflected at the third surface 16 and continues to travel along the diamond-shaped loop.

Figure 5:
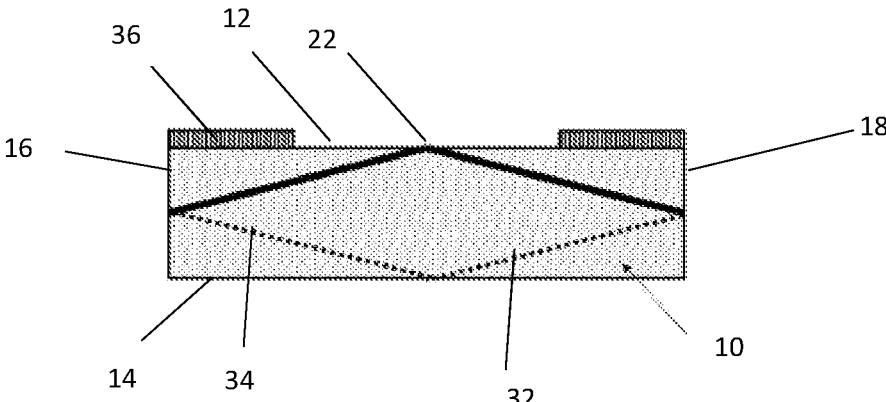
FIG. 5 shows the substrate of FIG. 4 including a microfluidic channel.

Referring to FIG. 5, the substrate 10 may form part of a microfluidic channel 36. The diamond light path may perfectly aligned with the microfluidic channel 36, as shown in FIG. 5, such that there is no interaction between the light path and the features of the microfluidic channel 36. The diamond loop would continue indefinitely, growing continually weaker on each reflection until the number of photons in the beam is reduced to a point where no further reflection occurs.

Figure 6:
FIG. 6 shows the reflected beam interacting with the features within an overly long substrate.
Figure 6:
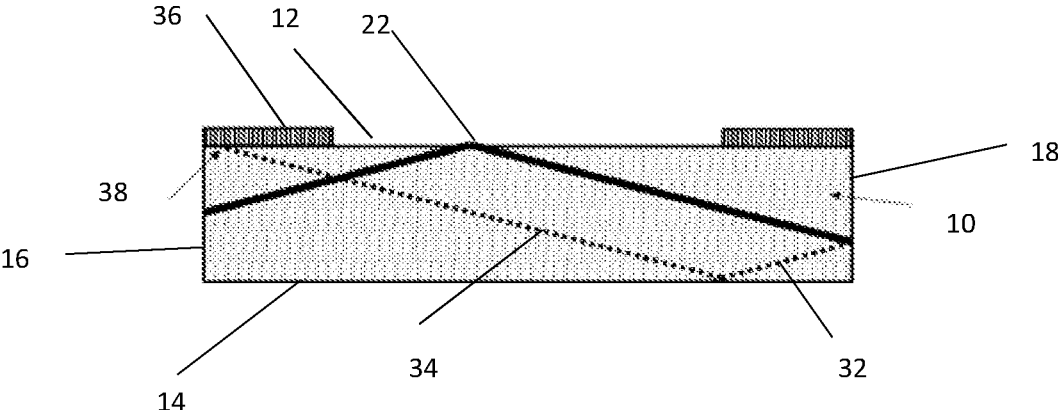

FIG. 6 shows an example of a substrate 10 wherein the three characteristics of the surfaces have not been manipulated to ensure that light launched through the third surface impinges on the centre of the first surface 12 solely at the test site 22. As shown in FIG. 6, the length of the substrate 10 is overly long, which causes the reflected beam 34 reflected from the second substrate 14, to be incident on the features of the microfluidic channel 36. At the site of scattering 38, light is scattered across a wide range of directions, including directly into the imaging lens 26, and into other parts of the system that are in the field of view of the image sensor 28. A similar outcome would also occur if the angle of the incident beam 20 was too steep.

Figure 7:
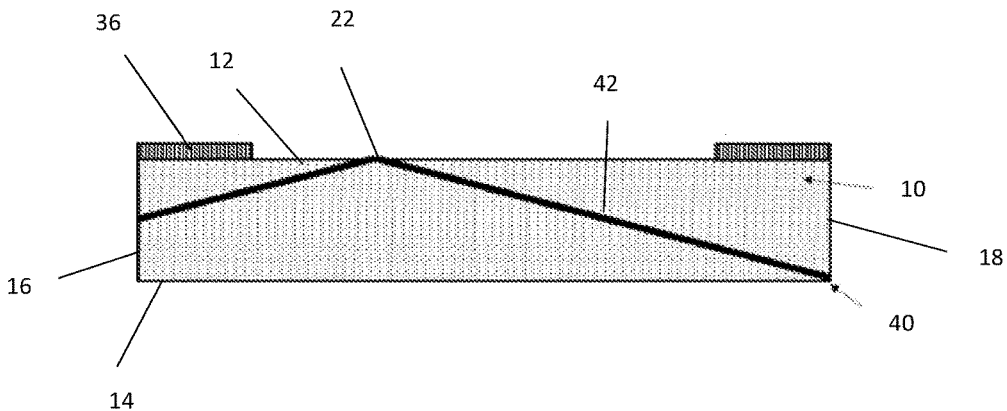
FIG. 7 shows a light beam interacting with the corner of a substrate at the output face of an overly long substrate.

Referring to FIG. 7, an additional example of a substrate 10 which is overly long is shown. After undergoing Total Internal Reflection at the test site 22, the beam of light 42 interacts with the corner of the substrate 10 at the fourth surface 18, resulting in an unwanted scattering site 40 due to the non-planar surface and the typically lower optical quality achieved at corners, i.e., bevels, chipping, cracking.

Figure 8:
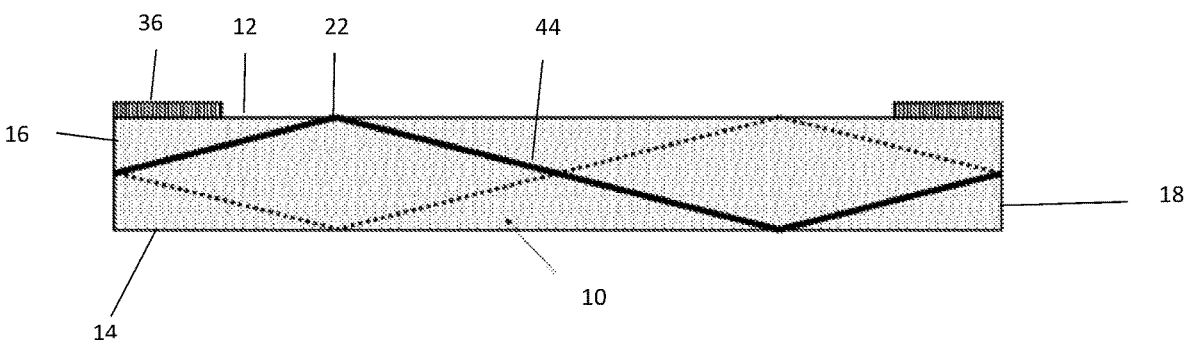
FIG. 8 shows a closed reflection loop with two Total Internal Reflections on each pass through the substrate.

Referring to FIG. 8, an example of a closed reflection loop 44 is shown in which the light beam undergoes two total internal reflections on each pass through the substrate 10.

Figure 9:
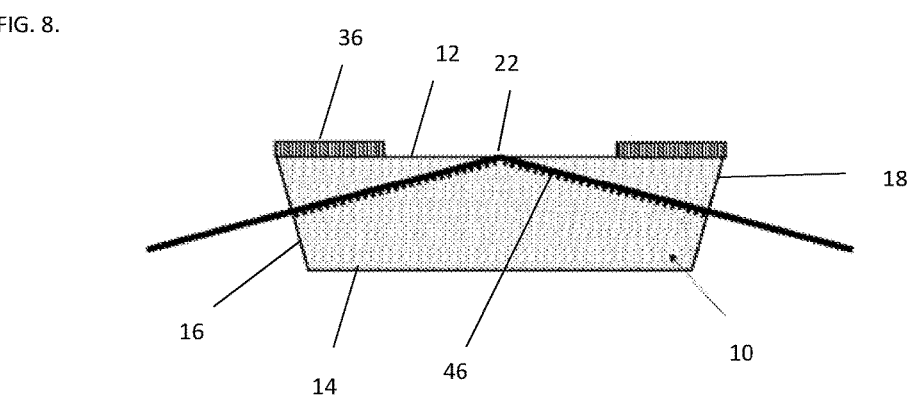
FIG. 9 shows a closed reflection loop within a dove prism-shaped substrate.

Referring to FIG. 9 an example of a substrate 10 where the angles subtended between the first 12 and third surfaces 12 is not 90° is shown. The prism geometry of the substrate enables the closed reflection loop 46 to be perfectly reflected back and forth between the third surface 16 and the fourth surface 18.

Various further aspects and embodiments of the present invention will be apparent to those skilled in the art in view of the present disclosure.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

It will further be appreciated by those skilled in the art that although the invention has been described by way of example with reference to several embodiments. It is not limited to the disclosed embodiments and that alternative embodiments could be constructed without departing from the scope of the invention as defined in the appended claims.

The invention claimed is:

1. A substrate for facilitating the measurement, using a Total Internal Reflection based optical imaging system, of the status of an assay; the substrate comprising:

a first surface including a test site at which one or more reagents for the assay are immobilised;

a second surface substantially parallel to the first surface;

a third surface joining the first and second surfaces; and a fourth surface joining the first and second surfaces, wherein three characteristics of the surfaces are manipulated to ensure that light launched through the third surface impinges on the first surface substantially at the test site and then undergoes Total Internal Reflection, impinges on the fourth surface, and is partially reflected to impinge on the second surface, wherein the reflected light forms a closed loop reflection pattern comprising at least one diamond pattern, and wherein the three characteristics are:

the length of the first and second surfaces between the third and fourth surfaces is 5 to 130 mm;

the length of the third and fourth surfaces is 0.5 to 10 mm; and the angle subtended between the first and third surfaces is substantially 90°.

2. The substrate according to claim 1, wherein at least a portion of the light is transmitted through the fourth surface.

3. The substrate according to claim 1, wherein the closed loop reflection pattern comprises more than one diamond.

4. The substrate according to claim 1, wherein the substrate is glass.

5. The substrate according claim 1, wherein at least one of the surfaces of the substrate is polished.

6. The substrate according to claim 1, wherein the first surface of the substrate forms part of a microfluidic channel.

7. A Total Internal Reflection (TIR) based optical imaging system for reducing unwanted light scattering at a test site of the substrate of claim 1, the system comprising:

an incident beam which illuminates the test site at such an angle to facilitate TIR, wherein a portion of the incident beam is reflected at the fourth surface of the substrate; and a closed reflection loop formed by the reflected portion of the incident beam, which at least partly follows the same path within the substrate as the incident beam, wherein by at least partly following the same path as the incident beam, the closed reflection loop reduces unwanted light scattering by avoiding interaction with features of the substrate which could cause the beam to scatter, and wherein the closed loop reflection pattern comprises at least one diamond pattern.

8. The system according to claim 7, further comprising a light source.

9. The system according to claim 7, further comprising a detector.

10. The system according to claim 9, wherein the detector further comprises imaging optics and an imaging sensor.

* * * * *